US012772136B2

(12) United States Patent
Srivastava et al.

(10) Patent No.: US 12,772,136 B2
(45) Date of Patent: Oct. 20, 2026

(54) FACILITATING RADIO ACCESS TECHNOLOGY (RAT) INTERWORKING FOR USER EQUIPMENT IN A MOBILE NETWORK ENVIRONMENT

(71) Applicant: Cisco Technology, Inc., San Jose, CA (US)

(72) Inventors: Vimal Srivastava, Kannamangala (IN); Ravi Shekhar, Pune (IN); Pankaj Sachdeva, Western Australia (AU)

(73) Assignee: CISCO TECHNOLOGY, INC., San Jose, CA (US)

( * ) Notice: Subject to any disclaimer, the term of this patent is extended or adjusted under 35 U.S.C. 154(b) by 303 days.

(21) Appl. No.: 18/430,801

(22) Filed: Feb. 2, 2024

(65) Prior Publication Data

US 2025/0254591 A1 Aug. 7, 2025

(51) Int. Cl.
*H04W 36/32* (2009.01)
*H04W 36/30* (2009.01)
*H04W 84/12* (2009.01)

(52) U.S. Cl.
CPC ......... *H04W 36/322* (2023.05); *H04W 36/30* (2013.01); *H04W 84/12* (2013.01)

(58) Field of Classification Search
CPC .... H04W 36/322; H04W 36/30; H04W 84/12
See application file for complete search history.

(56) References Cited

U.S. PATENT DOCUMENTS

2015/0327129 A1* 11/2015 Faccin ............ H04W 36/00837 370/331
2017/0339725 A1* 11/2017 Cho ...................... H04W 76/20
2020/0178123 A1 6/2020 Shan et al.
2020/0275330 A1 8/2020 Tang
2021/0378056 A1 12/2021 Kumar et al.
2022/0060893 A1* 2/2022 Gundavelli ........... H04W 12/40
2022/0095260 A1 3/2022 Shan
2022/0408301 A1* 12/2022 Parikh .................. H04M 15/61
(Continued)

OTHER PUBLICATIONS

3GPP: "3rd Generation Partnership Project, Technical Specification Group Core Network and Terminals, 5G System, Access and Mobility Policy Control Service, Stage 3, (Release 18)", 3GPP TS 29.507, V18.4.0, Dec. 2023, pp. 1-84.
(Continued)

*Primary Examiner* — Brian J. Gillis
(74) *Attorney, Agent, or Firm* — Edell, Shapiro & Finnan, LLC

(57) ABSTRACT

Provided herein are techniques to facilitate Radio Access Technology (RAT) interworking for user equipment in a mobile networking environment. In one example, a method may include obtaining, from a user equipment (UE) that is connected to first wireless wide area (WWA) RAT type, a request to connect to a second WWA RAT type in which the request includes a location indicator identifying a location of the UE and a parameter identifying the second WWA RAT type; querying a subscription management element to determine whether the UE is subscribed to connect to the second WWA RAT type at the location; and based, at least in part upon determining that the UE is subscribed to connect to the second WWA RAT type at the location, sending a policy to the UE including an indicator of the second WWA RAT type to cause the UE to connect to the second WWA RAT type.

20 Claims, 5 Drawing Sheets

(56) References Cited

U.S. PATENT DOCUMENTS

2023/0189371 A1 6/2023 Ahmad et al.
2025/0093179 A1* 3/2025 Sadek ................ G01C 21/3889

OTHER PUBLICATIONS

3GPP: "3rd Generation Partnership Project, Technical Specification Group Core Network and Terminals, 5G System, Session Management Policy Control Service, Stage 3 (Release 18)", 3GPP TS 29.512, V18.4.0, Dec. 2023, pp. 1-302.
3GPP: "3rd Generation Partnership Project, Technical Specification Group Services and System Aspects, General Packet Radio Service (GPRS) Enhancements for Evolved Universal Terrestrial Radio Access Network (E-UTRAN) Access (Release 18)", 3GPP TS 23.401, V18.4.0, Dec. 2023, pp. 1-452.
3GPP: "3rd Generation Partnership Project, Technical Specification Group Services and System Aspects, Procedures for the 5G System (5GS), Stage 2 (Release 18)", 3GPP TS 23.502 V18.4.0, Dec. 2023, pp. 1-899.
3GPP: "3rd Generation Partnership Project, Technical Specification Group Services and System Aspects, System architecture for the 5G System (5GS), Stage 2 (Release 18)", 3GPP TS 23.501, V18.4.0, Dec. 2023, pp. 1-697.
Cisco: "Support for RAT/Frequency Selection Priority ID (RFSP-ID) ", SGSN Administration Guide, StarOS Release 21.17, Dec. 19, 2019, pp. 1-6.
ETSI: "5G, 5G System, Access and Mobility Policy Control Service, Stage 3 (3GPP TS 29.507 version 17.10.0 Release 17)", ETSI TS 129 507, V17.10.0, Sep. 2023, pp. 1-77.
ETSI: "5G, 5G System, Session Management Policy Control Service, Stage 3 (3GPP TS 29.512 version 17.12.0 Release 17)", ETSI TS 129 512 V17.12.0, Sep. 2023, pp. 1-276.
ETSI: "5G, Procedures for the 5G System (5GS) (3GPP TS 23.502 version 17.10.0 Release 17)", ETSI TS 123 502 V17.10.0, Sep. 2023, 753 Pages.
ETSI: "5G, System Architecture for the 5G System (5GS) (3GPP TS 23.501 version 17.10.0 Release 17)", ETSI TS 123 501 V17.10.0, Sep. 2023, 575 Pages.
ETSI: "LTE, General Packet Radio Service (GPRS) Enhancements for Evolved Universal Terrestrial Radio Access Network (E-UTRAN) Access (3GPP TS 23.401 version 17.9.0 Release 17)", ETSI TS 123 401, V17.9.0, Sep. 2023, pp. 1-455.
Pancorbo B., "TEI17-DCAMP WID", Dynamically Changing AM Policies in the 5GC Issues for discussion, 3GPP, Jan. 21, 2021, pp. 1-6.

* cited by examiner

FACILITATING RADIO ACCESS TECHNOLOGY (RAT) INTERWORKING FOR USER EQUIPMENT IN A MOBILE NETWORK ENVIRONMENT

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of end users increases, management of communication resources for a mobile network and for user equipment becomes more critical.

DETAILED DESCRIPTION

Overview

Figure 1:
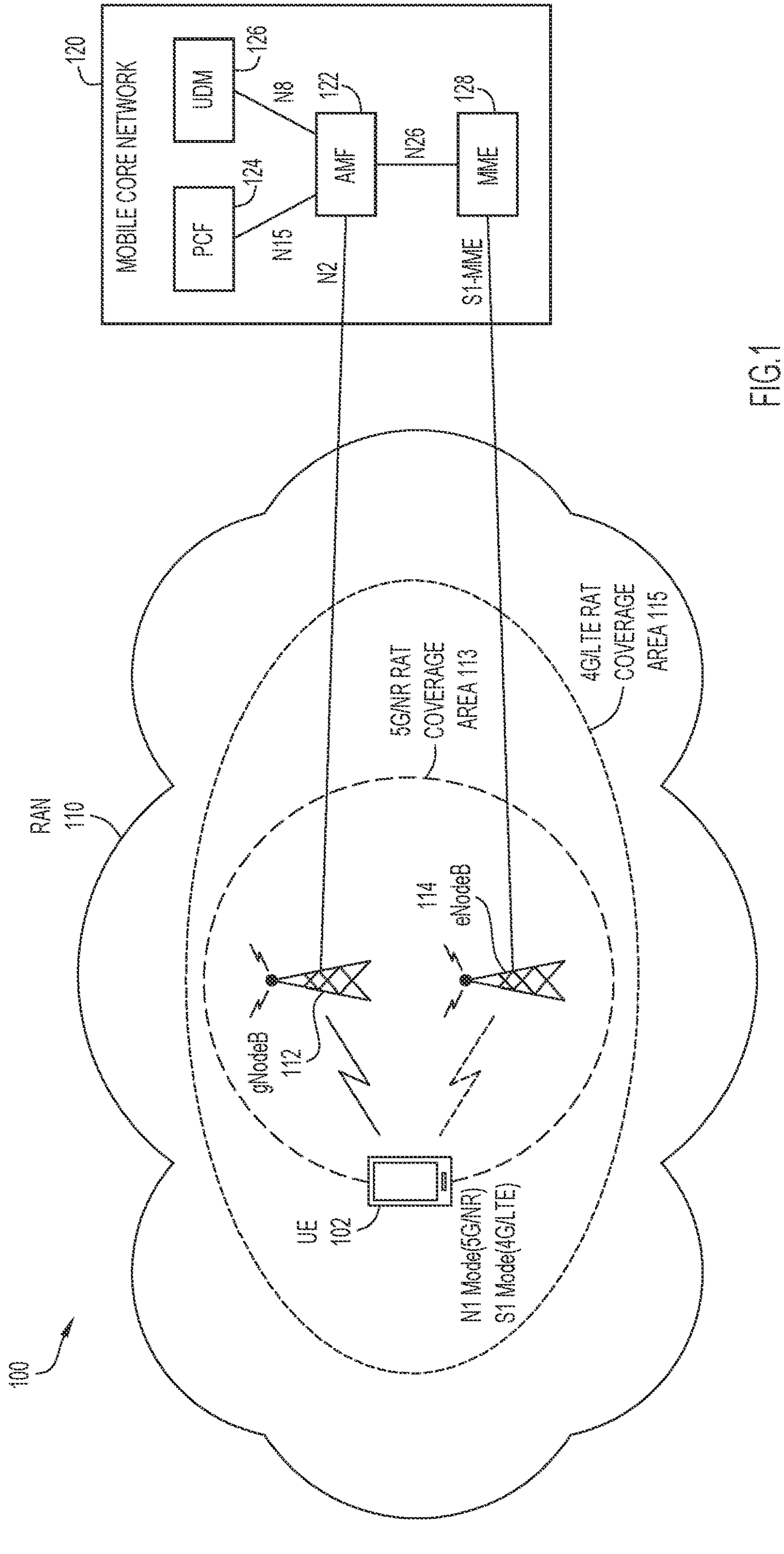
FIG. 1 illustrates a system that may be provided to facilitate Radio Access Technology (RAT) interworking for a user equipment (UE) in a mobile network environment, according to an example embodiment.

Provided herein are techniques to facilitate Radio Access Technology (RAT) interworking for a user equipment (UE) among different RAT types in a mobile network environment. In at least one embodiment, for environments involving Third Generation Partnership Project (3GPP) Fourth Generation (4G)/Long Term Evolution (LTE) and Fifth Generation (5G)/New Radio (NR) RAT types, embodiments herein may facilitate a mobile core network or, more specifically, an Access and Mobility Management Function (AMF) of the mobile core network, triggering a UE that is connected to a first wireless wide area (WWA) RAT type, such as a 5G/NR RAT type to instead connect to a second WWA RAT type, such as a 4G/LTE RAT type upon receiving a request from the UE to transition/connect to the second WWA RAT type (e.g., 4G/LTE), for example, due to a poor quality connection or poor coverage of the first WWA RAT type (e.g., 5G/NR). The mobility management node can trigger the UE to connect to the second WWA RAT type by sending an updating Access and Mobility Management (AM) policy to the UE that includes a RAT/Frequency Selection Priority (RFSP) index for the second WWA RAT type.

In at least one embodiment, a computer-implemented method is provided that may be performed by a mobility management node of a mobile core network in which the method may include obtaining, from a user equipment (UE) that is connected to first wireless wide area (WWA) radio access technology (RAT) type, a request for the UE to connect to a second WWA RAT type, wherein the request includes a location indicator identifying a location of the UE and a parameter identifying the second WWA RAT type; querying a subscription management element of the mobile core network to determine whether the UE is subscribed to connect to the second WWA RAT type at the location of the UE; and based, at least in part upon determining that the UE is subscribed to connect to the second WWA RAT type at the location, sending a policy to the UE that includes an indicator of the second WWA RAT type to cause the UE to connect to the second WWA RAT type.

Example Embodiments

In current mobile core network architectures (e.g., as defined per 3GPP Technical Specification (TS) 23.501), an N26 interface is defined to facilitate connection between a 5G/NR AMF within a 5G core (5GC) network and a 4G/LTE Mobility Management Entity (MME) within a 4G/Evolved Packet Core (EPC) network. The N26 interface can be used to exchange UE context between an MME and AMF for interworking scenarios, such as when a UE hands over from one RAT type to another RAT type (e.g., 4G to 5G or 5G to 4G). When latching on/connecting to the 5G/NR RAT type, a UE's mode of operating (e.g., for communications to/from the mobile core network) is in an N1 operating mode, whereas, when latching on/connecting to the 4G/LTE RAT type, the UE's mode of operating is in an S1 operating mode.

In one scenario, such as when a UE that is connected to the 5G/NR RAT type, moves from the 5G/NR coverage to the 4G/LTE coverage, the UE connects to a 4G/LTE radio and performs a Tracking Area Update (TAU) operation towards the MME, which triggers the MME to fetch the context for the UE from the AMF via the N26 interface. Typically, a UE maintains the N1 mode as the priority operating mode so that whenever 5G/NR coverage is available, the UE can connect to the 5G/NR RAT type and, if needed can switch to the S1 mode for a 4G/LTE RAT type connection (e.g., when outside the coverage of the 5G/NR RAT type, during an Evolve Packet System (EPS) fallback, and/or for certain emergency calls).

Typically, a UE does not disable the N1 mode while in 5G/NR coverage but there may be situations in which the UE may desire to disable the N1 mode such as, for example, if the 5G/NR coverage is patch and/or congested in which the UE may disable the N1 mode due to 5G/NR coverage quality and/or to avoid handovers during emergency calls.

Currently, the 3GPP organization is studying dynamic Access Management (AM) policies that may be utilized by the core network to cause a UE to latch onto a particular RAT type by providing a RAT/Frequency Selection Priority (RFSP) value or index for the particular RAT type to the UE. For example, a 3GPP 5G WWA radio node, such as a gNodeB can make use of an RFSP index for radio resource management such that the mobile core network or, more specifically a mobility management node within the mobile core network, such as an Access and Mobility Management Function (AMF), can use the RFSP index for a particular RAT type to direct the UE to latch on to/connect to the particular RAT type through dynamically updating an AM policy for the UE for various reasons, such as network congestion, coverage issues, etc. based on a trigger received from a Network Data Analytics Function (NWDAF), based on local policies, or the like. Sending an RFSP index to a UE through an updated AM policy can trigger the UE to latch onto/connect to a network preferred radio access (e.g., 5G/NR or 4G/LTE).

Some commercially available mobile devices are configured to disable the N1 mode and/or the S1 mode based on certain device-specific local policies; however, such configurations can result in inconsistent network behaviors that can lead to interworking problems. For example, for scenarios in which a UE moves from a 5G/NR connection to a 4G/LTE connection with the N1 mode disabled then, when the UE sends a TAU to the MME, the TAU sent by the UE will indicate that the N1 mode is disabled for the UE. Upon determining that the N1 mode is disabled for the UE, the MME will not try to fetch the context for the UE from the AMF (via the N26 interface), which could cause various problems. For example, the MME gets the UE session state from the AMF. However, if the MME doesn't get the UE session state, the MME won't recognize the TAU from the MME and could perceive the message as some stray message from the UE, which can result in the MME rejecting the received TAU. 3GPP specifications do not define what actions the MME should take in such scenarios, which can lead to inconsistent network behaviors as handling such scenarios can be left to mobile network and/or device providers to determine how to implement/treat disablement of N1/S1 mode for UEs.

Rather than configuring user equipment to disable a specific N1 and/or S1 operating mode, embodiments herein provide for addressing such issues by enabling user equipment (UE), when within certain RAT type coverage and desiring to switch from one RAT type connection to another RAT type connection (e.g., from 5G/NR to 4G/LTE), to send a request to the mobile core network to trigger the mobile core network to cause the UE to latch on/connect to a desired RAT type.

Thus, embodiments herein may provide for UE mobility and network selection decisions to be driven from the mobile core network based on RAT type change request(s) sent by the UE to the mobile core network, rather than being driven by the UE alone through the disabling of N1/S1 operating modes by the UE. The mobile core network can use additional information, such as subscription information stored for the UE, that can be used to determine whether the UE is subscribed to request network RAT type changes for a given location of the UE within a Radio Access Network (RAN). Upon determining that the UE is subscribed for a given RAT type change requested by the UE at a given location and is authorized for the given RAT type change (e.g., based on policy information stored within the mobile core network), the mobile core network or, more specifically, a mobility management node within the mobile core network, such as an AMF, can send an updated AM policy to the UE including an RFSP index for the RAT type to which the UE is to connect, such as the RAT type requested by the UE, which triggers the UE to connect to the requested RAT type.

Referring to FIG. 1, FIG. 1 illustrates a system 100 that may be provided to facilitate RAT interworking for a UE in a mobile network environment, according to an example embodiment. In at least one embodiment, system 100 may include a Radio Access Network (RAN) 110 and a mobile core network 120. Also shown in FIG. 1 is a UE 102. It is to be understood that any number of UEs may be present in system 100.

The RAN 110 may include any number of radio nodes that may provide Radio Frequency (RF) coverage for any combination of RAT types. In at least one embodiment, RAN 110 may include a 5G/NR radio node, such as a gNodeB 112, that may provide RF coverage for the 5G/NR RAT type (shown in FIG. 1 as 5G/NR RAT coverage area 113), and RAN 110 may include a 4G/LTE radio node, such as an eNodeB 114, that may provide RF coverage for the 4G/LTE RAT type (shown in FIG. 1 as 4G/LTE RAT coverage area 115, typically referred to as a E-UTRA (Evolved Universal Mobile Telecommunications System (UMTS) Terrestrial Radio Access).

In accordance with embodiments herein, each of a 5G/NR RAT type and a 4G/LTE RAT type may each be considered a wireless wide area (WWA) RAT type, such as a 3GPP cellular RAT type. For example, the 5G/NR RAT type provided by gNodeB 112 may be considered a 3GPP WWA/cellular 5G/NR RAT type and the 4G/LTE RAT type provided by eNodeB 114 may be considered a 3GPP WWA/cellular 4G/LTE RAT type, each of which may be distinguished from/considered different from wireless local area (WLA) RAT types, such as Institute of Electrical and Electronics Engineers (IEEE) 802.11 (e.g., Wi-Fi®) RAT types.

Although separate 5G/NR and 4G/LTE radio nodes are illustrated in FIG. 1, in some instances any number of converged 5G/4G radio nodes may be provided in RAN 110 that can coverage for both 5G and 4G RAT types. The configuration of radio nodes for RAN 110 is provided for illustrative purposes only and is not meant to limit the broad scope of embodiments herein. Further, it is to be understood that the size/shape of the coverage areas 113 and 115 are provided for illustrative purposes only and are not meant to limit the broad scope of embodiments herein.

Regarding mobile core network 120, mobile core network 120 may include any number of physical and/or virtualized network functions (VNFs) for providing combined 4G/5G mobile core network functionality within system 100. For example, in at least one embodiment, mobile core network 120 may be configured with 4G/LTE and 5G core network functionality to facilitate a converged 4G/5G mobile core network. In at least one embodiment, 5G core network functionality provided or mobile core network 120 may include control plane functionality an Access and Mobility Management Function (AMF) 122, a Policy Control Function (PCF) 124, and a Unified Data Management (UDM) element or entity, shown in FIG. 1 as UDM 126. UDM 126 can interface with and/or be implemented in combination with a Unified Data Repository (UDR) (not shown in FIG. 1). In at least one embodiment, 4G/LTE core network functionality can include control plane functionality, such as a Mobility Management Entity (MME) 128.

It is to be understood that mobile core network 120 may include any other 5G and/or 4G network functions/functionality, as may be provided by 3GPP standards, such as any number/combination of a User Plane Function (UPF), a Session Management Function (SMF), a Serving Gateway (SGW), a Packet Data Network (PDN) Gateway (PGW), control plane/user plane functionality such as a PGW-C (control plane)/PGW-U (user plane), a SGW-C/SGW-U, a Policy and Charging Function (PCRF), a Home Subscriber Service (HSS), etc. Such network functionality is not shown in FIG. 1 for purposes of brevity only in order to illustrate other features of embodiments herein and is not meant to limit the broad scope of the teachings of embodiments herein.

Generally, for mobile core network 120, AMF 122 may interface with PCF 124 via a 3GPP N15 interface, may interface with UDM 126 via a 3GPP N8 interface, and may interface with gNodeB 112 via a 3GPP N2 interface. Per 3GPP standards, an N1 interface may be facilitated between AMF 122 and UE 102. AMF 122 and MME 128 may interface with each other via a 3GPP N26 interface and MME 128 may further interface with eNodeB 114 via an S1-MME interface. Other interfaces may be facilitate/provided between/among various elements of system in accordance with any 3GPP standards, such as 3GPP Technical Specification (TS) 23.501, 23.502, etc.

Broadly, during operation of system 100, embodiments herein provide for UE 102 mobility and network selection decisions to be driven from the mobile core network 120 based on WWA RAT type change request(s) sent by the UE 102 to the mobile core network 120, rather than being driven by the UE 102 alone through the disabling of N1/S1 operating modes by the UE 102.

Upon receiving a WWA RAT type change request message from the UE, the mobile core network 120, or, more specifically, a mobility management node within the mobile core network 120, such as AMF 122, can determine whether the UE 102 is subscribed to perform a requested WWA RAT type change for the location of the UE 102 within the RAN 110, such as a switch/handover from 5G/NR (e.g., a first WWA RAT type) to 4G/LTE (e.g. a second WWA RAT type), by querying a subscription management element of the mobile core network 120, such as UDM 126 to confirm, via RFSP subscription information stored for UE 102 (e.g., a subscriber associated therewith), whether the UE 102 is subscribed to perform the requested RAT type change at the location of the UE 102 within RAN 110. Upon determining that the UE 102 is subscribed for the RAT type change at the location, the mobility management node (e.g., AMF 122) can perform an authorization exchange with a policy function of the mobile core network 120, such as PCF 124, through which the PCF 124 can authorize the RAT type change to the requested 4G/LTE RAT type based on policy information stored at the PCF 124 indicating that the UE is authorized to connect to the 4G/LTE RAT type.

The PCF 124 can authorize the 4G/LTE connection for UE 102 by providing the RFSP index for the requested RAT type to the mobility management node (e.g., AMF 122). Thereafter, the mobility management node (e.g., AMF 122) can send an updated AM policy to the UE 102 including the RFSP index for the RAT type requested by the UE 102, which triggers the UE 102 to connect to the requested RAT type.

Through embodiments of system 100, UE 102 may be configured to request, though non-access stratum (NAS) messaging, a RAT type change towards mobile core network 120 (e.g., towards AMF 122), referred to herein as a NAS UE "Requested_RAT_Change" message in which the NAS UE Requested_RAT_Change message can include location information identifying the location of the UE 102 within the RAN 110 and a parameter or attribute that can be used to identify the RAT type for which connection is being requested. In at least one embodiment, the NAS UE Requested_RAT_Change message sent by the UE can further include a cause indicator that indicates a cause for requesting the RAT type change.

For example, if the UE 102 is currently connected to gNodeB 112 for a 5G/NR RAT type connection but the quality of the 5G/NR RAT connection is poor; for example, as shown in FIG. 1, UE 102 may be at an edge of the 5G/NR RAT coverage area 113, the UE 102 can send a NAS UE Requested_RAT_Change message towards AMF 122 requesting connection to the 4G/LTE RAT type (provided by eNodeB 114). The NAS US Requested_RAT_Change message can include an identifier for the UE 102/a subscriber associated with UE 102, generally referred to herein as an identifier for UE 102, which can be labeled as a 'UE-ID', such as an International Mobile Subscriber Identity (IMSI), a Subscription Permanent Identifier (SUPI), a Subscription Concealed Identifier (SUCI), or any other appropriate 3GPP identity used to identify UE 102/the subscriber of UE 102. In on example, consider that an identifier of UE 102, such an IMSI/SUPI/SUCI, etc. can be indicated as 'UE-ID[100102]' for various examples discussed herein.

The NAS UE Requested_RAT_Change message can further include a location indicator indicating location of UE 102 and a parameter/attribute identifying the WWA RAT type to which the UE 102 is requesting to connect. For example, for a requested connection to the 4G/LTE RAT type, a NAS UE Requested_RAT_Change message can include a requested RAT parameter/attribute identifying the RAT type for the corresponding RFSP index that is requested by the UE or stated differently, identifies the RAT type to which UE is requesting to connect. For example, the UE can include in the NAS UE Requested_RAT_Change message a requested RAT parameter of 'LTE_RFSP' indicating that the request is for a 4G/LTE RFSP index that is to trigger the UE to connect to the 4G/LTE RAT type.

In various embodiment, the location indicator sent by the UE 102 in the request can include a cell identifier for the WWA radio node to which the UE 102 is currently connected or may include a Tracking Area Code (TAC) associated with the WWA radio node to which UE 102 is currently connected. For example, if connected to the 5G/NR RAT type, the UE 102 can include a NR Cell Global Identifier (NCGI) for the gNodeB 112 to which UE 102 is currently connected. For the present example, consider that the NCGI for gNodeB 112 is set to 'NCGI=110112'. Other cell identifiers may include Cell Globel Identification (CGI) (e.g., for second Generation (2G) or Third Generation (3G) WWA radio nodes) or extended CGI (eCGI) for 4G/LTE WWA radio nodes.

The NAS UE Requested_RAT_Change message can also include a cause indicator indicating the reason or cause for the RAT type change request being sent by the UE 102. For example, in at least one embodiment, the cause indicator can be set to indicate a poor-quality connection to the 5G/NR RAT, such as 'Bad_NR' or the like, for the UE 102 connection with gNodeB 112.

Upon obtaining the NAS UE Requested_RAT_Change message sent by UE 102, the AMF 122 can query a subscription management element of the mobile core network 120, such as the UDM 126 for RFSP subscription information for the UE 102/subscriber associated therewith that can be stored in UDM 126. The RFSP subscription information stored for the UE 102/subscriber can identify whether the UE 102/subscriber is subscribed for the RAT type change request for the location at which UE 102 is located.

For the example in which the UE 102 has requested a RAT type change from the 5G/NR RAT type to the 4G/LTE RAT type, the AMF 122 can query UDM 126 using the identifier for UE 102 (e.g., SUPI, SUCI, etc. for UE 102 contained in the NAS UE Requested_RAT_Change request message) to determine whether UE 102 is subscribed perform a RAT type change from the 5G/NR RAT type connection to a 4G/LTE RAT type connection for the current location of the UE 102 within RAN 110 (e.g., based on the NCGI of gNodeB 112). It may be important to manage such RAT type changes through UE subscription information stored via UDM 126, as many UEs may attempt to switch their RAT type at a given location, which could result in an overloading of one RAT type at the location. Through management of RAT type switches for different location(s) via UE subscription information stored via UDM 126, a mobile network operator (MNO) or service provider (SP) can efficiently manage the loading of different RAT type(s) at different locations (e.g., only subscribers subscribing to an elevated tier of service may be allowed to request certain RAT type changes for one or more locations, etc.).

By way of illustration only, RFSP subscription information stored for UE 102 within UDM 126 can be configured to indicate 'UE-ID[100102]: RAT CHANGE 5G/NR->4G/LTE @ LOC [NCGI=110112]=TRUE' to indicate that UE 102 is subscribed to perform a 5G/NR to 4G/LTE RAT type change at the location of gNodeB 112 (based on the NCGI of gNodeB 112).

Thus, for an example in which the UE 102 has requested a RAT type change from the 5G/NR RAT type to the 4G/LTE RAT type, AMF 122 can determine that UE 102 is subscribed to switch/handover from the 5G/NR connection with gNodeB 112 to a 4G/LTE RAT type connection for the location of UE 102 within RAN 110. In this example, upon determining that UE 102 is subscribed to perform the switch from the 5G/NR connection to a 4G/LTE connection, the AMF 122 can perform an authorization exchange with the PCF 124 in order for the PCF 124 to authorize the 4G/LTE RAT type connection based on policy information stored at PCF 124 that identifies what RAT type connections are authorized by the mobile core network 120/PCF 124.

For the example in which the UE 102 has requested a RAT type change from the 5G/NR RAT type to the 4G/LTE RAT type, the authorization exchange performed by the AMF 122 may be include the AMF 122 sending an AM policy modification request to the PCF 124 indicating a request for the RFSP index for the 4G/LTE RAT type for UE 102. Consider for examples discussed herein with reference to system 100 that the RFSP index for the 4G/LTE RAT type is set to '1140' (e.g., 4G/LTE RFSP index=1140) and that the RFSP index for the 5G/NR RAT type is set to '1120' (e.g., 5G/NR RFSP index=1120).

For the example in which the UE 102 has requested a RAT type change from the 5G/NR RAT type to the 4G/LTE RAT type, upon determining that the 4G/LTE RAT connection is authorized, the PCF 124 can respond to the AMF 122 query with the RFSP index for the 4G/LTE RAT type (e.g., 4G/LTE RFSP index=1140) and the AMF 122 can send a UE update configuration procedure message to the UE 102 including an updated AM policy that identifies the RFSP index for the 4G/LTE RAT type which can trigger the UE 102 to latch onto/connect to the eNodeB 114 for establishing a 4G/LTE connection with the eNodeB 114.

Thus, embodiments herein may provide a protocol-based procedure for a network-driven approach for triggering a UE to perform a RAT type that can be aligned with 3GPP standards such that the UE does not need to disable an N1 or S1 operating mode for performing a RAT change selection; rather, the mobile core network 120 can be used to control which RAT type that the UE is to utilize through AM policy modifications/updates that can be sent to the UE. For example, by a UE, such as UE 102, not disabling its N1/S1 operating modes in order to perform a RAT type change from a 5G/NR connection to a 4G/LTE connection or from a 4G/LTE connection to a 5G/NR connection, but rather by the UE 102 being driven by the mobile core network (e.g., by AMF 122) to perform the RAT type switch through providing an updated AM policy to UE 102, embodiments herein may be used to ensure that context for UE 102 can successfully be fetched by MME 128 from AMF 122 upon the UE 102 connecting to the eNodeB 114.

Figure 2A:
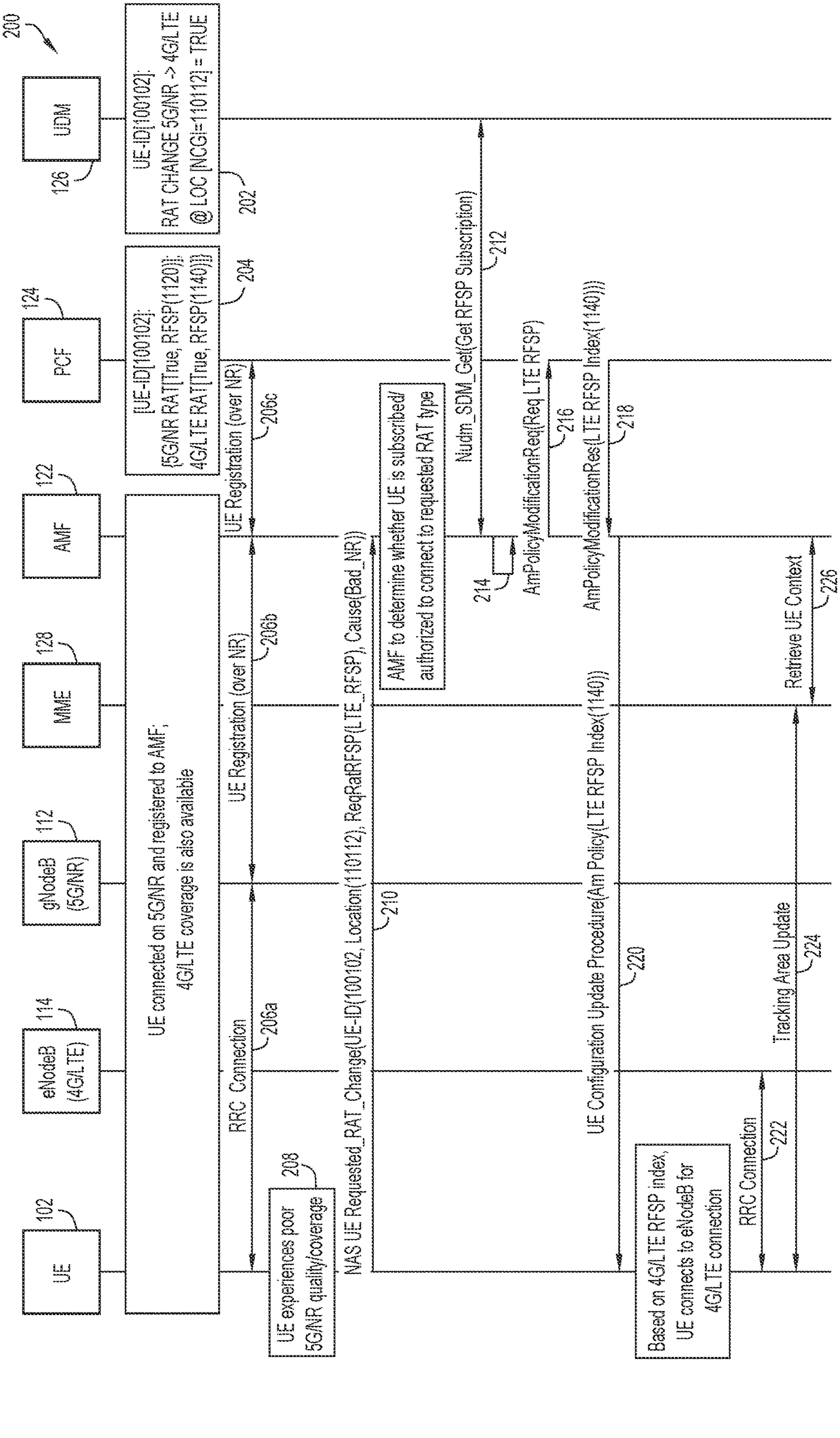
FIG. 2A is a message sequence diagram illustrating various example operations that may be utilized to facilitate RAT interworking for a UE in a mobile network environment, according to an example embodiment.
Figure 2B:
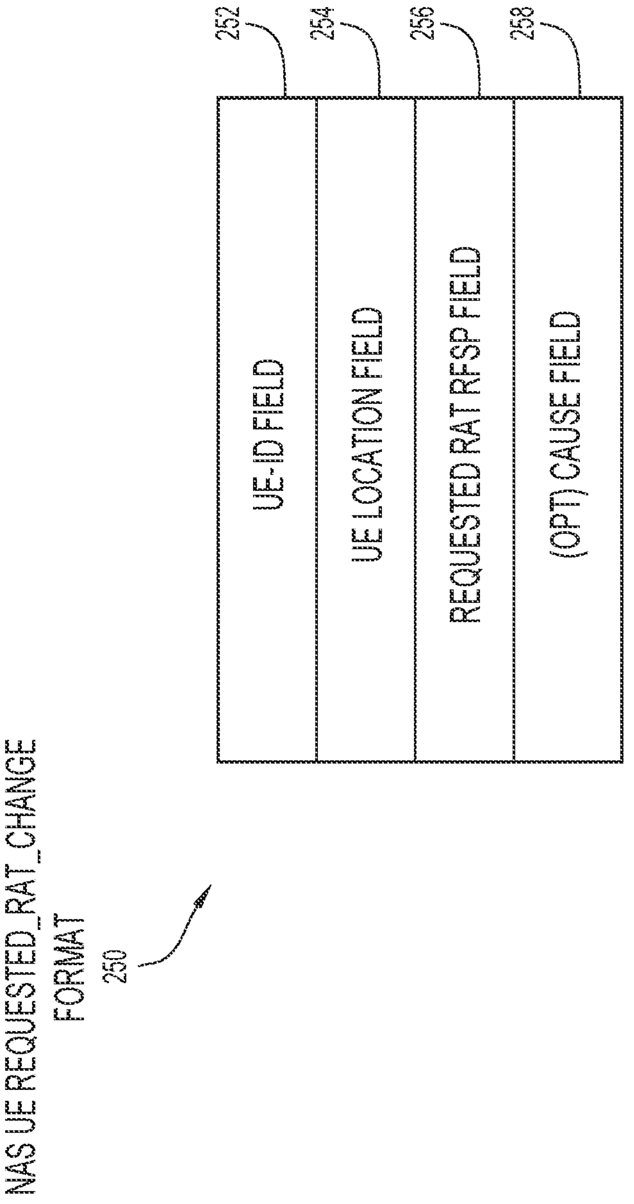
FIG. 2B is a schematic diagram illustrating an example format for a Non-Access Stratum (NAS) UE RAT type change request message that can be sent by a UE to request a RAT type change, according to an example embodiment.

With reference to FIG. 2A, FIG. 2A is a message sequence diagram 200 illustrating various example operations that may be utilized to facilitate RAT interworking for UE 102 in the mobile network environment of system 100 of FIG. 1, according to an example embodiment. FIG. 2B is a schematic diagram illustrating an example format for a NAS UE Requested_RAT_Change message that can be sent by a UE, such as UE 102 to request a RAT type change, according to an example embodiment. FIG. 2B is discussed with reference to FIG. 2A.

FIG. 2A includes UE 102, gNodeB 112, eNodeB 114, AMF 122, PCF 124, UDM 126, and MME 128. UDM 126 can be provisioned with RFSP subscription information for UE 102 that identifies whether UE 102 is subscribed to request RAT type change(s) at one or more locations, such as location(s) of RAN 110. For example, as shown at 202, RFSP subscription information can be provisioned for UE 102 (UE-ID[100102) identifying that UE 102 is subscribed to request RAT type changes from 5G/NR to 4G/LTE at the location of gNodeB 112, having NCGI=110112, such as 'UE-ID[100102]: RAT CHANGE 5G/NR->4G/LTE @ LOC [NCGI=110112]=TRUE'.

Further, PCF 124 can be provisioned with policy information for UE 102 that identifies whether UE 102 is authorized to connect to one or more RAT types of RAN 110. For example, as shown at 204, PCF 124 can be provisioned with a policy for UE 102 indicating that UE 102 is authorized to connect to the 5G/NR RAT type and the 4G/LTE RAT type. For example, a policy can be set for UE 102 indicating that UE 102 is authorized to connect to the 5G/NR RAT type and can identify the RFSP index for the 5G/NR RAT type and is authorized to connect to the 4G/LTE RAT type and can identify the RFSP index for the 4G/LTE RAT type, such as: [UE-ID[100102]: {5G/NR RAT [True, RFSP (1120)];4G/LTE RAT [True, RFSP (1140)]}. In at least one embodiment, one or more location restriction(s) can also be configured for the policy configured at the PCF 124. For example, in at least one embodiment, the 4G/LTE RAT RFSP policy configured for UE 102 at PCF 124 can be further configured to indicate that the UE may be authorized to connect to the 4G/LTE RAT type at the location of the gNodeB 112, or other similar location-based policy restriction that may be set for RAN 110.

For FIG. 2A, consider that UE 102 is connected on the 5G/NR RAT type (e.g., first WWA RAT type) via gNodeB 112, as generally shown at 206*a* (via Radio Resource Control (RRC) signaling with gNodeB 112), and performs registration with the AMF 122 (over 5G/NR, as generally shown at 206*b* and 206*c* in which PCF 124 authorizes the UE 102 connection/registration to the 5G/NR RAT type, for example, based on the policy configured for UE 102, as shown at 204. As illustrated in FIG. 1, consider that 4G/LTE coverage (e.g., second WWA RAT type) is also available at the location of UE 102 within RAN 110. In at least one embodiment, policy information indicating the RAT type to which a UE is authorized to connect can be configured within an AM-PCF policy element of PCF 124 that stores access and mobility management (AM) policies for the UE in which the PCF 124 may also be configured with a Session Management (SM) PCF (SM-PCF) element to store session management policies for the UE (e.g., for Protocol Data Unit (PDU) sessions that can be established by/for the UE) and may also be configured with a UE-PCF element to store UE specific policies for the UE in which such SM-PCF policies and UE-PCF policies.

As generally shown at 208, consider that UE 102 experiences poor 5G/NR quality/coverage. For example, as generally illustrated in FIG. 1, UE 102 may be at the edge of the 5G/NR RAT coverage area 115 and thus, may be experiencing poor 5G/NR quality/coverage. In accordance with embodiments herein, upon experiencing the poor 5G/NR quality/coverage, UE 102 may be triggered to send/transmit a NAS UE Requested_RAT_Change message toward AMF 122 (via gNodeB 112), as shown at 210, in order to request a RAT type change to connect to the 4G/LTE RAT type instead of being connected to the 5G/NR RAT type.

As shown at 210, the NAS UE Requested_RAT_Change message can include a UE-ID for UE 102 (UE-ID(100102)) and location information identifying the location of UE 102 within RAN 110 (e.g., Location(110112) for the NCGI of gNodeB 112). The NAS UE Requested_RAT_Change message sent at 210 may further include a requested RAT parameter that identifies the RAT type for the corresponding RFSP index (RAT type change) to which the UE 102 is requesting to connect, such as 'ReqRatRFSP(LTE_RFSP)', which for the present example can be used to indicate that the UE 102 is requesting the RFSP index for the 4G/LTE RAT type in order to connect to the 4G/LTE RAT type. The NAS UE Requested_RAT_Change message sent at 210 may further include a cause indicator indicating a cause for the request of the UE 102 to connect to the 4G/LTE RAT type, such as 'Cause (Bad_NR)', which for the present example can be used to indicate that the UE 102 is experiencing poor 5G/NR quality/coverage.

Referring briefly to FIG. 2B, FIG. 2B is a schematic diagram illustrating an example NAS UE Requested_RAT_Change message format 250 that can be sent by a UE to request a RAT type change from a first WWA RAT type to a second WWA RAT type, according to an example embodiment. As shown in FIG. 2B, the NAS UE Requested_RAT_Change message format 250 can include a UE-ID field 252, a UE location field 254, a requested RAT RFSP field 256, and a cause field 258 in which the cause field 258 may be an optional field that may or may not be included on a NAS UE Requested_RAT_Change message sent by a UE requesting a corresponding RAT type change.

During operation, the UE-ID field 252 can be set by the UE sending the message to include an identifier for the UE, such as the IMSI, SUPI, SUCI, or the like for the UE. The UE location field 254 can be set by the UE sending the message to include a location indicator of the UE, such as the NCGI for the gNodeB to which the UE is connected or any other appropriate location indicator that may identify the location of the UE with respect to the RAN in which the UE is located.

The requested RAT RFSP field 256 can be set by the UE sending the message to include a requested RAT parameter that identifies the RAT type for the corresponding RFSP index to which the UE is requesting to connect. For example, the requested RAT parameter may be set to an 'LTE_RFSP' bit/flag/attribute or the like to indicate that the UE is requesting to connect to the 4G/LTE RAT type and, thus, is requesting the RFSP index for the 4G/LTE RAT type. The (optional) cause field 258 can be set by the UE sending the message to include a cause indicator that identifies the cause or reason for which the UE is requesting to connect to another WWA RAT type (e.g., Bad_NR or the like).

Returning to FIG. 2A, receiving the NAS UE Requested_RAT_Change message triggers the AMF 122 to determine whether the UE 102 is subscribed to perform the RAT change to the 4G/LTE RAT type requested by the UE 102 at the location of the UE 102 and, if subscribed to perform the requested RAT type change at the corresponding location, to determine whether the UE 102 authorized to connect to the requested 4G/LTE RAT type in order to provide the 4G/LTE RFSP index to the UE 102 based on determining both that the UE 102 is subscribed to perform the requested RAT type change at the corresponding location and is authorized to connect to the 4G/LTE RAT type.

For example, as shown at 212, the AMF 122 can query the UDM 126 (generally, a subscription management element of mobile core network 120) using the UE-ID of UE 102 in order to obtain the RFSP subscription information for UE 102 stored at UDM 126 and determine based on the RFSP subscription information, as generally shown at 214, whether the UE 102 is subscribed to perform the requested 4G/LTE RAT type change at the location of the UE 102 within RAN 110. For example, the AMF 122 can obtain the RFSP subscription information 'UE-ID[100102]: RAT CHANGE 5G/NR->4G/LTE @ LOC [NCGI=110112] =TRUE' from UDM 126 and determine that the UE 102 is authorized to perform a RAT type change from the 5G/NR RAT type to the 4G/LTE RAT type based on the RFSP subscription information, the location information (NCGI 110112 of gNodeB 112), and the 'LTE_RFSP' requested RAT parameter included in the NAS UE Requested_RAT_Change message. In at least one embodiment, the query performed by the AMF 122 at 212 may be a 'Nudm_SDM_Get' subscriber data management (SDM) request message sent by the AMF 122 that includes the UE-ID of UE 102 and an indication that the request of for the RFSP subscription information for the UE.

Upon determining that the UE 102 is subscribed to perform the requested 5G/NR to 4G/LTE RAT type change at the location of the UE 102, the AMF 122 can further perform an authorization exchange with a policy function of the mobile core network 120, such as PCF 124, to determine whether the UE 102 is also authorized to connect to the 4G/LTE RAT type. For example, as shown at 216 and 218, the AMF 122 can perform an authorization exchange with PCF 124 to determine whether the UE is authorized to connect to the 4G/LTE RAT type in which the PCF 124, upon checking the policy configured for UE 102 (as discussed at 204) and determining that the UE 102 is authorized to connect to the 4G/LTE RAT type, can return the RFSP index for the 4G/LTE RAT type (e.g., 4G/LTE RFSP index=1140) to AMF 122.

For example, at 216, the AMF 122 can send an AM policy modification request message to the PCF 124 indicating a request for the RFSP index for the 4G/LTE RAT type for UE 102 (e.g., AMPolicyModificationReq(Req LTE RFSP)), which can trigger the PCF 124 to determine, based on the policy configured at 204, that the UE 102 is authorized to connect to the 4G/LTE RAT type. Based on determining that the UE 102 s authorized to connect to the 4G/LTE RAT type, the PCF 124 can respond to the AMF 122 request with the LTE RFSP index of 1140 (e.g., AMPolicyModificationRes (LTE RFSP Index)), as shown at 218.

Upon determining that the UE 102 is subscribed to connect to the 4G/LTE RAT type at the location of the UE 102 and that the UE is authorized to connect to the 4G/LTE RAT type, the AMF 122 can respond to the NAS UE Requested_RAT_Change message with a UE configuration update procedure message that includes an updated AM policy that includes/identifies the LTE RFSP index (1140), as shown at 220.

The LTE RFSP index obtained by the UE 102 via the updated AM policy may be considered an indicator of the 4G/LTE RAT type that is to cause the UE 102 to connect to the 4G/LTE RAT type such that, based on receiving the LTE RFSP index, the UE 102 is caused to connect to eNodeB 114 via RRC signaling, as generally shown at 222, for establishing the 4G/LTE connection.

In accordance with embodiments herein, UE 102 can connect to the 4G/LTE RAT without disabling its N1 operating mode, thus when performing a TAU operation towards the MME 128, as shown at 224, the UE 102 does not indicate that that its N1 operating mode is disabled such that the MME 128 can be triggered to retrieve context for UE 102 from the AMF 122, as shown at 226, and the UE 102 can continue to perform communications with the mobile core network 120 for one or more sessions that can be established via the 4G/LTE RAT connection.

Accordingly, embodiments herein facilitate a protocol-based procedure for managing UE connectivity that aligns with 3GPP standards so that a UE does not have to disable its N1/S1 operating mode for RAT selection rather, the mobile core network 120 can be used to control which RAT type that the UE is to utilize through AM policy modifications/updates that can be sent to the UE. The protocol-based procedure as provided through embodiments herein can be facilitated utilizing the NAS UE Requested_RAT_Change message through which a UE can request a change to a given WWA RAT type that includes a location indication of the UE and, optionally, a cause indicator that indicates a cause/reason for the requested RAT change. The mobile core network, or more specifically, a mobility management node of the mobile core network, such as an AMF can perform a subscription check with a subscription management element, such as a UDM, of the mobile core network to determine whether the UE is subscribed to such a requested WWA RAT type change at the location of the UE. A policy function, such as a PCF, of the mobile core network can authorize the requested WWA RAT type change by providing an indicator of the requested WWA RAT type, such as an RFSP index of the requested WWA RAT type, to the mobility management node, which can send the indicator to the UE via an AM policy through a UE configuration update procedure that may be performed as prescribed at least by 3GPP TS 23.502, Version 18.4.0, Section 4.2.4, published December 2023 (or other appropriate version).

Although not shown in FIG. 2A, in some instances the UE 102 can move back to the 5G/NR RAT type upon a reboot, following expiration of an RFSP timer value as prescribed by 3GPP standards in which, following expiration of an RFSP in use timer, MME 128 can trigger the UE 102 to move back to the 5G/NR RAT (e.g., being the preferred RAT type for the UE 102 to connect), and/or using any other techniques as may be understood by a person having ordinary skill in the art.

Figure 3:
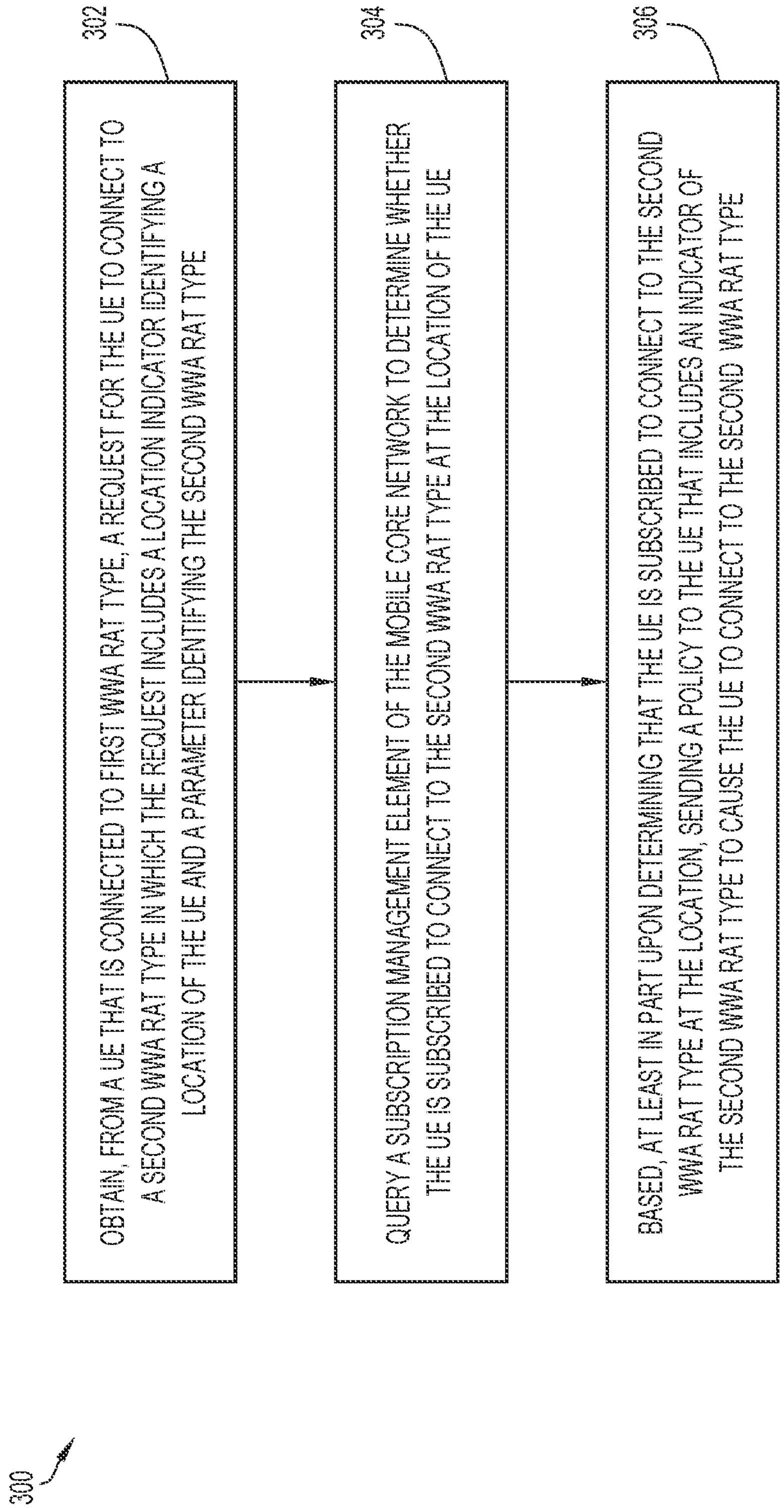
FIG. 3 is a flow chart depicting a method according to an example embodiment.

Referring to FIG. 3, FIG. 3 is a flow chart depicting a method 300, according to an example embodiment. In at least one embodiment, method 300 illustrates operations that may be performed by a mobility management node of a mobile core network, such as AMF 122 of mobile core network 120, in order to facilitate RAT interworking for a UE, such as UE 102, in the mobile network environment of system 100, as shown in FIG. 1, according to an example embodiment.

At 302, the method may include obtaining (by a mobility management node), from a user UE that is connected to first WWA RAT type (e.g., 5G/NR), a request for the UE to connect to a second WWA RAT type (e.g., 4G/LTE) in which the request includes a location indicator identifying a location of the UE and a parameter identifying the second WWA RAT type (to which the UE is requesting to connect). The request may also include an identifier of the UE, such as a SUPI, SUCI, or the like for the UE. The parameter identifying the second WWA RAT type may be used to identify the second WWA RAT type for the corresponding RFSP index that is requested by the UE.

In at least one embodiment, the request may be a NAS UE Requested_RAT_Change message as discussed herein that includes an identifier for the UE, the location indicator, and the parameter identifying the second WWA RAT type for the RFSP index to which the UE is requesting to connect. In at least one embodiment, the request may be a NAS UE Requested_RAT_Change message that also includes a cause indicator indicating a cause for the request for the UE to connect to the second WWA RAT type (e.g., cause: 'Bad_NR' or the like).

At 304, the method may include querying (by the mobility management node) a subscription management element of the mobile core network to determine whether the UE is subscribed to connect to the second WWA RAT type at the location of the UE.

At 306, the method may include based at least in part upon determining that the UE is subscribed to connect to the second WWA RAT type at the location of the UE, sending (by the mobility management node) a policy to the UE that includes an indicator of the second WWA RAT type to cause the UE to connect to the second WWA RAT type. The indicator of the second WWA RAT type may be the RFSP index for the second WWA RAT type that is included in an updated AM policy sent to the UE.

Figure 4:
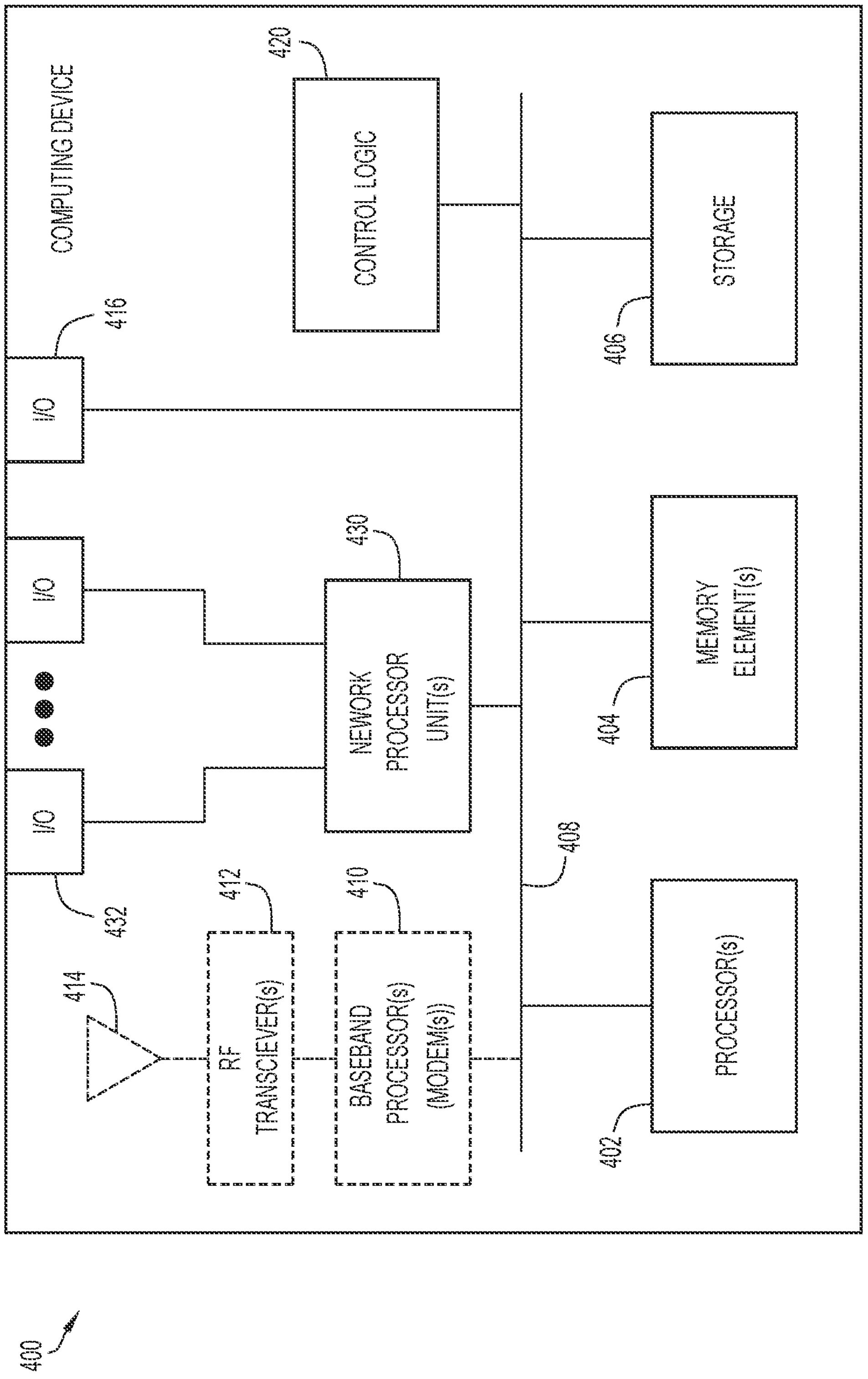
FIG. 4 illustrates a hardware block diagram of a computing device configured to perform functions associated with operations discussed in connection with embodiments herein.

Referring to FIG. 4, FIG. 4 illustrates a hardware block diagram of a computing device 400 that may perform functions associated with operations discussed herein in connection with the techniques described for embodiments herein. In various embodiments, a computing device or apparatus, such as computing device 400 or any combination of computing devices 400, may be configured as any entity/entities in order to perform operations of the various techniques discussed for embodiments herein, such as any elements, functions, etc. discussed for embodiments herein (e.g., UE 102, AMF 122, PCF 124, UDM 126, MME 128, gNodeB 112, and eNodeB 114).

In at least one embodiment, the computing device 400 may be any apparatus that may include one or more processor(s) 402, one or more memory element(s) 404, storage 406, a bus 408, one or more network processor unit(s) 430 interconnected with one or more network input/output (I/O) interface(s) 432, one or more I/O interface(s) 416, and control logic 420. In various embodiments, instructions associated with logic for computing device 400 can overlap in any manner and are not limited to the specific allocation of instructions and/or operations described herein.

For embodiments in which computing device 400 may be implemented as any device capable of wireless communications, computing device 400 may further include at least one baseband processor or modem 410, one or more radio RF transceiver(s) 412 (e.g., any combination of RF receiver (s) and RF transmitter(s)), one or more antenna(s) or antenna array(s) 414.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element (s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 430 may enable communication between computing device 400 and other systems, entities, etc., via network I/O interface(s) 432 (wired and/or wireless) to facilitate operations discussed for various embodiments described herein. In various embodiments, network processor unit(s) 430 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 432 can be configured as one or more Ethernet port(s), Fibre Channel ports, any other I/O port(s), and/or antenna(s)/antenna array(s) now known or hereafter developed. Thus, the network processor unit(s) 430 and/or network I/O interface(s) 432 may include suitable interfaces for receiving, transmitting, and/or otherwise communicating data and/or information (wired and/or wirelessly) in a network environment.

I/O interface(s) 416 allow for input and output of data and/or information with other entities that may be connected to computing device 400. For example, I/O interface(s) 416 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 400 is implemented as a wireless device or any apparatus capable of wireless communications, the RF transceiver(s) 412 may perform RF transmission and RF reception of wireless signals via antenna(s)/antenna array(s) 414, and the baseband processor or modem 410 performs baseband modulation and demodulation, etc. associated with such signals to enable wireless communications for computing device 400.

In various embodiments, control logic 420 can include instructions that, when executed, cause processor(s) 402 to perform operations, which can include, but not be limited to, providing overall control operations of computing device 400; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element (s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may be performed by a mobility management node of a mobile core network, in which the method includes obtaining, obtaining, from a user equipment (UE) that is connected to first wireless wide area (WWA) radio access technology (RAT) type, a request for the UE to connect to a second WWA RAT type, wherein the request includes a location indicator identifying a location of the UE and a parameter identifying the second WWA RAT type; querying a subscription management element of the mobile core network to determine whether the UE is subscribed to connect to the second WWA RAT type at the location of the UE; and based, at least in part upon determining that the UE is subscribed to connect to the second WWA RAT type at the location, sending a policy to the UE that includes an indicator of the second WWA RAT type to cause the UE to connect to the second WWA RAT type.

In one instance, the indicator of the second WWA RAT type is a RAT/Frequency Selection Priority (RFSP) index for the second WWA RAT type. In one instance, the mobility management node is an Access and Mobility Management Function (AMF), and the subscription management element is a Unified Data Management (UDM) element. In one instance, the first WWA RAT type is a Third Generation Partnership Project (3GPP) Fifth Generation/New Radio RAT type and the second WWA RAT type is a 3GPP Fourth Generation/Long Term Evolution RAT type.

In one instance, the request further includes a cause indicator indicating a cause for the request for the UE to connect to the second WWA RAT type. In one instance, the cause indicator indicates a poor quality of the first WWA RAT type.

In one instance, the method may further include performing an authorization exchange with a policy function of the mobile core network to obtain the indicator of the second WWA RAT type from the policy function based on the UE being authorized to connect to the second WWA RAT type. In one instance, the location indicator is a cell identifier for a radio node of the first WWA RAT type with which the UE is connected. In one instance, the request is a Non-Access Stratum message obtained from the UE. In one instance, the UE does not disable an N1 operating mode upon connecting to the second WWA RAT type, which may be a 3GPP 4G/LTE RAT type.

Variations and Implementations

Generally, per-3GPP standards for a mobile core network, an AMF interfaces with a SMF which can further interface with one or more UPFs. An AMF and an SMF can further interface with a PCF, a UDM/UDR, and various other core network functions via 3GPP Service-Based Interface (SBI) constructs/interfaces and/or any other 3GPP interfaces/reference points. An AMF and a UPF can further interface with a RAN node, such as one or more gNBs or disaggregated components thereof.

One or more wireless device sessions, often referred to as PDU sessions can be established between a wireless device and a UPF for a core network in which the session may be facilitated/managed by an SMF, as is generally understood in the art.

Generally, a radio access may include one or more radio access network (RAN) radio nodes that may implement a wireless wide area (WWA) (e.g., cellular) air interface and, in some instances also a wireless local area (WLA) (e.g., Wi-Fi®) air interface, for any combination of Radio Access Technology (RAT) types (e.g., 'accesses'), such as 3GPP WWA licensed spectrum accesses (e.g., Fourth Generation/Long Term Evolution (4G/LTE), 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, a WWA RAN radio node may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like)), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more wireless devices, may utilize to connect for one or more sessions (e.g., voice/IMS, data/internet (e.g., video, gaming, etc.), combinations thereof, etc.).

A wireless device, such as UE 102, or any other wireless devices discussed herein, may be considered any electronic device, etc. that initiates a connection or communication session with a corresponding core network, and may be inclusive of but not limited to a computer, a mobile phone or mobile communication device, an electronic tablet, a laptop, etc., an electronic device such as an industrial device (e.g., a robot), automation device, enterprise device, appliance, Internet of Things (IoT) device, a router or gateway with a WWA/WLA interface, a WWA/WLA (cellular/Wi-Fi®) enabled device, and/or any other device, component, element, or object capable of initiating voice, audio, video, media, or data exchanges within a system. Thus, a UE may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of one or more RAN(s).

Generally, an AMF may facilitate access and mobility management control/services for one or more wireless devices seeking connection to/connected to a mobile core network. Generally, an SMF may be responsible for wireless device session management, with individual functions/services being supported on a per-session basis in order to facilitate data transfer(s) between a wireless device and one or more networks via one or more UPFs. Generally, a UPF may operate to provide packet routing and forwarding operations for user data traffic and may also perform a variety of functions such as packet inspection, traffic optimization, Quality of Service (QoS), policy enforcement and user data traffic handling (e.g., to/from one or more data networks), billing operations (e.g., accounting, etc.), among other operations, for wireless device sessions. Typically, a UDM stores subscription data (typically in combination with a UDR) for subscribers (e.g., a user that may be associated with a given wireless device) that can be retrieved and/or otherwise obtained/utilized during operation of a core network system. Typically, a PCF stores policy data in order to provide policy control services (e.g., to facilitate access control, network selection, etc.). Typically, a charging function (CHF) provides support for charging services such as facilitating the transfer of policy counter information associated with subscriber (e.g., UE) spending limits, etc.

In general, authentication services may include authenticating and/or authorizing one or more device(s) for one or more connections and/or communications and may be inclusive of any Authentication, Authorization, and Accounting (AAA) services that may be facilitated via any combination of authentication/authorization protocols such as Remote Authentication Dial-In User Service (RADIUS), DIAMETER, Extensible Authentication Protocol (EAP) [including any EAP variations], and/or the like. Generally, authentication refers to a process in which an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed by a mobility management node of a mobile core network, the method comprising:

obtaining, from a user equipment (UE) that is connected to a first wireless wide area (WWA) radio access technology (RAT) type, a Non-Access Stratum (NAS) RAT change request for the UE to connect to a second WWA RAT type, wherein the NAS RAT change request includes a location indicator identifying a location of the UE, a parameter identifying the second WWA RAT type, and a cause indicator indicating a poor quality of the first WWA RAT type as a cause for the request for the UE to connect to the second WWA RAT type;

querying a subscription management element of the mobile core network to determine whether the UE is subscribed to connect to the second WWA RAT type at the location of the UE; and based, at least in part upon determining that the UE is subscribed to connect to the second WWA RAT type at the location, sending a policy to the UE that includes an indicator of the second WWA RAT type to cause the UE to connect to the second WWA RAT type.

2. The method of claim 1, wherein the indicator of the second WWA RAT type is a RAT/Frequency Selection Priority (RFSP) index for the second WWA RAT type.

3. The method of claim 1, wherein the mobility management node is an Access and Mobility Management Function (AMF) and the subscription management element is a Unified Data Management (UDM) element.

4. The method of claim 1, wherein the first WWA RAT type is a Third Generation Partnership Project (3GPP) Fifth Generation/New Radio RAT type and the second WWA RAT type is a 3GPP Fourth Generation/Long Term Evolution RAT type.

5. The method of claim 1, further comprising:

performing an authorization exchange with a policy function of the mobile core network to obtain the indicator of the second WWA RAT type from the policy function based on the UE being authorized to connect to the second WWA RAT type.

6. The method of claim 5, wherein the policy function is a Policy Control Function (PCF).

7. The method of claim 1, wherein the location indicator is a cell identifier for a radio node of the first WWA RAT type with which the UE is connected.

8. The method of claim 1, wherein the location indicator is a tracking area code (TAC) associated with a radio node of the first WWA RAT type with which the UE is connected.

9. One or more non-transitory computer readable storage media encoded with instructions that, when executed by a processor, cause the processor to perform operations, comprising:

obtaining, from a user equipment (UE) that is connected to a first wireless wide area (WWA) radio access technology (RAT) type of a mobile core network, a Non-Access Stratum (NAS) RAT change request for the UE to connect to a second WWA RAT type, wherein the NAS RAT change request includes a location indicator identifying a location of the UE, a parameter identifying the second WWA RAT type, and a cause indicator indicating a poor quality of the first WWA RAT type as a cause for the request for the UE to connect to the second WWA RAT type;

querying a subscription management element of the mobile core network to determine whether the UE is subscribed to connect to the second WWA RAT type at the location of the UE; and based, at least in part upon determining that the UE is subscribed to connect to the second WWA RAT type at the location, sending a policy to the UE that includes an indicator of the second WWA RAT type to cause the UE to connect to the second WWA RAT type.

10. The media of claim 9, wherein the indicator of the second WWA RAT type is a RAT/Frequency Selection Priority (RFSP) index for the second WWA RAT type.

11. The media of claim 9, wherein the instructions, when executed by a processor, cause the processor to perform further operations, comprising:

performing an authorization exchange with a policy function of the mobile core network to obtain the indicator of the second WWA RAT type from the policy function based on the UE being authorized to connect to the second WWA RAT type.

12. The media of claim 9, wherein the location indicator is a cell identifier for a radio node of the first WWA RAT type with which the UE is connected.

13. The media of claim 9, wherein the location indicator is a tracking area code (TAC) associated with a radio node of the first WWA RAT type with which the UE is connected.

14. A mobility management node of a mobile core network comprising:

at least one memory element for storing data; and at least one processor for executing instructions associated with the data, wherein executing the instructions causes the mobility management node to perform operations, comprising:

obtaining, from a user equipment (UE) that is connected to a first wireless wide area (WWA) radio access technology (RAT) type, a Non-Access Stratum (NAS) RAT change request for the UE to connect to a second WWA RAT type, wherein the NAS RAT change request includes a location indicator identifying a location of the UE, a parameter identifying the second WWA RAT type, and a cause indicator indicating a poor quality of the first WWA RAT type as a cause for the request for the UE to connect to the second WWA RAT type;

querying a subscription management element of the mobile core network to determine whether the UE is subscribed to connect to the second WWA RAT type at the location of the UE; and based, at least in part upon determining that the UE is subscribed to connect to the second WWA RAT type at the location, sending a policy to the UE that includes an indicator of the second WWA RAT type to cause the UE to connect to the second WWA RAT type.

15. The mobility management node of claim 14, wherein the indicator of the second WWA RAT type is a RAT/Frequency Selection Priority (RFSP) index for the second WWA RAT type.

16. The mobility management node of claim 14, wherein the first WWA RAT type is a Third Generation Partnership Project (3GPP) Fifth Generation/New Radio RAT type and the second WWA RAT type is a 3GPP Fourth Generation/Long Term Evolution RAT type.

17. The mobility management node of claim 14, wherein executing the instructions causes the mobility management node to perform further operations, comprising:

performing an authorization exchange with a policy function of the mobile core network to obtain the indicator of the second WWA RAT type from the policy function based on the UE being authorized to connect to the second WWA RAT type.

18. The mobility management node of claim 14, wherein the location indicator is a cell identifier for a radio node of the first WWA RAT type with which the UE is connected.

19. The mobility management node of claim 14, wherein the location indicator is a tracking area code (TAC) associated with a radio node of the first WWA RAT type with which the UE is connected.

20. The mobility management node of claim 14, wherein the mobility management node is an Access and Mobility Management Function (AMF) and the subscription management element is a Unified Data Management (UDM) element.

* * * * *